US012804753B2

(12) United States Patent
Dong

(10) Patent No.: US 12,804,753 B2
(45) Date of Patent: Nov. 17, 2026

(54) COMMUNICATION LINK CONTROL METHOD AND APPARATUS, AND ELECTRONIC DEVICE AND STORAGE MEDIUM

(71) Applicant: Beijing Xiaomi Mobile Software Co., Ltd., Beijing (CN)

(72) Inventor: Xiandong Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 288 days.

(21) Appl. No.: 18/699,529

(22) PCT Filed: Oct. 9, 2021

(86) PCT No.: PCT/CN2021/122928

§ 371 (c)(1),
(2) Date: Apr. 8, 2024

(87) PCT Pub. No.: WO2023/056652

PCT Pub. Date: Apr. 13, 2023

(65) Prior Publication Data

US 2024/0414793 A1 Dec. 12, 2024

(51) Int. Cl.
*H04W 76/12* (2018.01)
*H04L 69/14* (2022.01)
(Continued)

(52) U.S. Cl.
CPC ............. *H04W 76/15* (2018.02); *H04L 69/14* (2013.01); *H04W 74/0816* (2013.01)

(58) Field of Classification Search
CPC .... H04W 76/15; H04W 74/0816; H04L 69/14
(Continued)

(56) References Cited

U.S. PATENT DOCUMENTS 11,102,824 B2 * 8/2021 Jung .................. H04W 74/085
2015/0245382 A1 * 8/2015 Park ...................... H04W 72/20
455/450

(Continued)

FOREIGN PATENT DOCUMENTS

CN 111918408 A 11/2020
CN 113015234 A 6/2021

(Continued)

OTHER PUBLICATIONS

NPL Search Terms (Year: 2026).*

(Continued)

*Primary Examiner* — Syed A Zaidi
(74) *Attorney, Agent, or Firm* — Volpe Koenig

(57) ABSTRACT

A communication link control method, apparatus, and a storage medium for managing multiple communication links in devices supporting Non-AP Multi-Link (MLD) configurations that enhance the efficiency of wireless communication in devices with multi-link capabilities. The efficiency of the wireless communication is enhanced: identifying when a random backoff operation occurs in one communication link and then assessing the operating mode of a second, idle communication link in relation to the first. If the first link is busy and a backoff operation is required, a channel clear assessment is conducted.

17 Claims, 2 Drawing Sheets

(51) Int. Cl.
*H04W 74/0816* (2024.01)
*H04W 76/15* (2018.01)

(58) Field of Classification Search
USPC .................................................. 370/328, 329
See application file for complete search history.

(56) References Cited

U.S. PATENT DOCUMENTS

| | | | | |
|---|---|---|---|---|
| 2018/0359780 | A1* | 12/2018 | Zhang | H04B 7/0417 |
| 2020/0053794 | A1 | 2/2020 | He | |
| 2020/0260358 | A1* | 8/2020 | Ratnam | H04B 7/024 |
| 2021/0076398 | A1* | 3/2021 | Naribole | H04W 74/0816 |
| 2021/0195540 | A1* | 6/2021 | Fischer | H04L 1/08 |
| 2021/0266891 | A1* | 8/2021 | Chu | H04L 5/1469 |
| 2021/0282186 | A1* | 9/2021 | Cherian | H04W 74/0816 |
| 2022/0007417 | A1* | 1/2022 | Xin | H04W 74/0816 |
| 2023/0179686 | A1* | 6/2023 | Kim | H04L 69/14 370/329 |
| 2024/0292463 | A1* | 8/2024 | Kim | H04W 74/006 |

FOREIGN PATENT DOCUMENTS

| | | | |
|---|---|---|---|
| CN | 113068214 | A | 7/2021 |
| JP | 2020061775 | A | 4/2020 |
| WO | 2020/226462 | A1 | 11/2020 |
| WO | 2021/194125 | A1 | 9/2021 |
| WO | 2021/201506 | A1 | 10/2021 |

OTHER PUBLICATIONS

State Intellectual Property Office of the People's Republic of China, Office Action and Search Report Issued in Application No. 2021800031173, May 22, 2025, 15 pages.

Chen Changying et al., "MAC layer channel backoff algorithm for wireless multimedia sensor networks", Transducer and Microsystem Technologies, Oct. 20, 2013, 6 pages.

ISA State Intellectual Property Office of the People's Republic of China, International Search Report Issued in Application No. PCT/CN2021/122928, Mar. 23, 2022, WIPO, 4 pages.

European Patent Office, Extended European Search Report Issued in Application No. 21959742.4, Oct. 14, 2024, Germany, 13 pages.

Insun Jang (LG Electronics): "Non-AP MLD Initiated Aggregation: Opportunity in TXOP", XP068170364, IEEE 802.11-20/0739rl, Aug. 3, 2020, 13 pages.

Matthew Fischer (Broadcom Inc): "Synchronous Transmitter Medium State Information", XP068172732, IEEE 802.11-20/0082rl, Apr. 8, 2020, 29 pages.

ISA State Intellectual Property Office of the People's Republic of China, Written Opinion of the International Searching Authority Issued in Application No. PCT/CN2021/122928, Mar. 23, 2022, WIPO, 7 pages.

* cited by examiner

COMMUNICATION LINK CONTROL METHOD AND APPARATUS, AND ELECTRONIC DEVICE AND STORAGE MEDIUM

CROSS-REFERENCE TO RELATED APPLICATIONS

The present disclosure is a U.S. national phase of PCT Application No. PCT/CN2021/122928 filed on Oct. 9, 2021, which is hereby incorporated by reference in its entirety.

TECHNICAL FIELD

Embodiments of the present disclosure relate to a technical field of mobile communication. Specifically, the embodiments of the present disclosure relate to a communication link control method and apparatus, an electronic device, and a storage medium.

BACKGROUND

With the rapid development of mobile communication technologies, wireless fidelity (Wi-Fi) technologies have made huge advances in aspects such as transmission rates and throughputs. At present, one research scope of Wi-Fi technologies is 320 MHz bandwidth transmission, aggregation and collaboration of multiple frequency bands, etc., and its main application scenarios include video transmission, augmented reality (AR), virtual reality (VR), etc.

Specifically, the aggregation and collaboration of multiple frequency bands refers to devices communicating with each other in 2.4 GHZ, 5.8 GHZ, 6 GHZ, and other frequency bands simultaneously. For a scenario in which devices communicate with each other in multiple frequency bands simultaneously, a new media access control (MAC) mechanism needs to be defined for management. In addition, the aggregation and collaboration of multiple frequency bands are expected to support low-latency transmission.

At present, technologies of the aggregation and collaboration of multiple frequency bands will support a maximum bandwidth of 320 MHz (160 MHz+160 MHz), and in addition, may also support 240 MHz (160 MHz+80 MHz) and other bandwidths supported by existing standards.

The currently studied Wi-Fi technologies support multi-link communication. For example, in a wireless local area network, a basic service set (BSS) may be composed of an AP and one or more stations (STAs) that communicate with the AP. The AP and the STAs may be multi-link devices (MLDs), respectively, and the MLDs support a function of enabling simultaneous transmission and/or reception in multiple links (multi-link) at the same time. Thus, there may be multiple links between an AP MLD and an STA MLD for communication.

SUMMARY

Embodiments of the present disclosure provide a communication link control method and apparatus, an electronic device, and a storage medium.

In an aspect, an embodiment of the present disclosure provides a communication link control method applied to a station device supporting multi-link Non-AP MLD. The method includes:

- in a case where a random backoff operation is performed in a first communication link, determining operating mode information of a second communication link with respect to the first communication link, where the second communication link is a communication link in an idle state; and
- performing a target processing operation on a contention window corresponding to the random backoff operation, and sending data in the second communication link, where the operating mode information indicates that an operating mode of the second communication link with respect to the first communication link includes non-simultaneous transmit and receive (NSTR) communication links.

An embodiment of the present disclosure further provides an electronic device, including a memory, a processor, and a computer program stored in the memory and executable by the processor. The processor, when executing the computer program, implements one or more methods of the embodiments of the present disclosure.

An embodiment of the present disclosure further provides a computer-readable storage medium. The computer-readable storage medium stores a computer program. The computer program, when executed by a processor, implements one or more methods of the embodiments of the present disclosure.

Additional aspects and advantages of the embodiments of the present disclosure will be set forth in part in the following description, and will become apparent from the following description or be learned by practice of the present disclosure.

BRIEF DESCRIPTION OF DRAWINGS

To more clearly describe technical solutions in embodiments of the present disclosure, accompanying drawings that need to be used in the description of the embodiments of the present disclosure will be briefly described below. Obviously, the accompanying drawings described below are for only some of the embodiments of the present disclosure, and those skilled in the art may also obtain other drawings based on these accompanying drawings without creative efforts.

DETAILED DESCRIPTION

Figure 1:
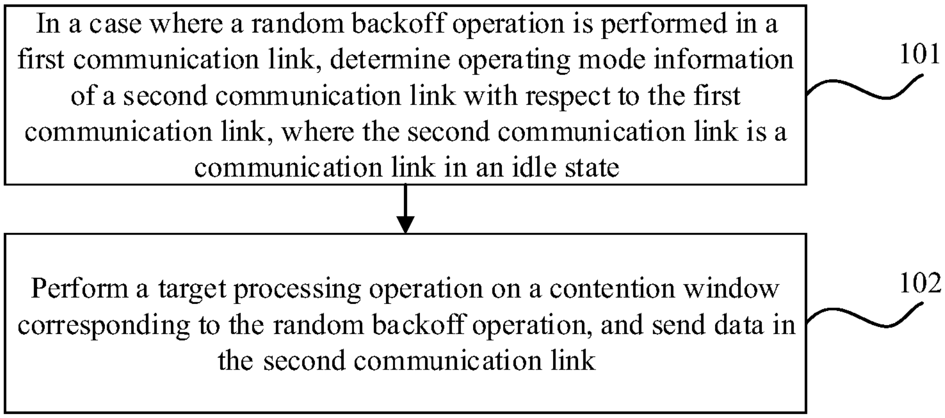
FIG. 1 is a first flowchart of a communication link control method provided by an embodiment of the present disclosure.

In embodiments of the present disclosure, the term "and/or" describes an association relationship between association objects, and represents that there may be three types of relationships. For example, A and/or B may represent: three situations, that is, existence of A alone, existence of both A and B, and existence of B alone. The character "/" generally represents that a relationship between context association objects is an "or" relationship.

In the embodiments of the present disclosure, the term "multiple" means two or more, and other quantifiers are similar thereto.

Exemplary embodiments will be described in detail herein, with examples thereof represented in the accompanying drawings. When the following description involves the accompanying drawings, the same numerals in different figures represent the same or similar elements unless otherwise indicated. Implementations described in the following exemplary embodiments do not represent all implementations consistent with the present disclosure. Rather, they are merely examples of apparatuses and methods consistent with some aspects of the present disclosure as detailed in the appended claims.

Terms used in the present disclosure are only for the purpose of describing specific embodiments, and are not intended to limit the present disclosure. Singular forms, "a/an," "the," and "this," used in the present disclosure and the appended claims are also intended to include majority forms, unless the context clearly indicates other meanings. It should also be understood that the term "and/or" used herein refers to and includes any or all possible combinations of one or more related listed items.

It should be understood that although terms, such as "first," "second," "third," etc., may be used in the present disclosure to describe various information, such information should not be limited by these terms. These terms are only used to distinguish the same type of information from each other. For example, without departing from the scope of the present disclosure, first information may also be referred to as second information, and similarly, the second information may also be referred to as the first information. Depending on the context, for example, a term "if" used here may be interpreted as "when," "while," or "in response to determining."

Technical solutions in the embodiments of the present disclosure will be described clearly and completely below in combination with the accompanying drawings in the embodiments of the present disclosure. Obviously, the described embodiments are merely a part of and not all of the embodiments of the present disclosure. All other embodiments obtained by those skilled in the art based on the embodiments of the present disclosure, without creative efforts, shall fall within the scope of protection of the present disclosure.

To improve spectrum utilization and adapt to a high-density communication environment, a non-simultaneous transmit and receive (NSTR) mechanism and a simultaneous transmit and receive (STR) mechanism are introduced. A random backoff mechanism is further introduced to implement the NSTR and the STR. Therefore, a method of performing the random backoff in a multi-link scenario needs to be provided.

Embodiments of the present disclosure provide a communication link control method and apparatus, an electronic device, and a storage medium, to provide a manner of performing random backoff in a multi-link scenario.

The methods and the apparatuses are based on the same concept of the present disclosure. Because the methods and the apparatuses solve the problem in a similar principle, implementation of the apparatuses and the methods may refer to each other, and repetitive contents will not be repeated.

As shown in FIG. 1, an embodiment of the present disclosure provides a communication link control method. Optionally, the method may be applied to a station device supporting multi-link Non-AP MLD, and the method may include the following steps.

At step 101, in a case where a random backoff operation is performed in a first communication link, operating mode information of a second communication link with respect to the first communication link is determined, where the second communication link is a communication link in an idle state.

In the embodiments of the present disclosure, the AP and the STA may be devices supporting multi-link, for example, the AP and the STA may be respectively represented as an AP MLD and a Non-AP MLD. For ease of description, an example in which one AP communicates with one STA in the multi-link is mainly described below; however, exemplary embodiments of the present disclosure are not limited thereto.

Figure 2:
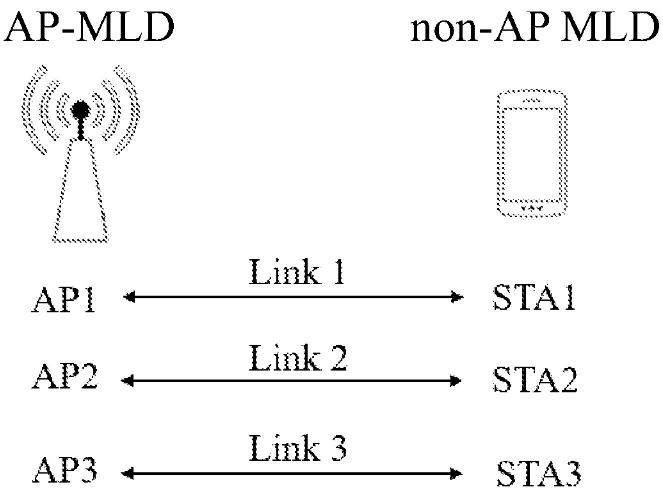
FIG. 2 is a schematic diagram of a first example of an embodiment of the present disclosure.

As a first example, referring to FIG. 2, the AP MLD may represent an access point supporting a multi-link communication function, and the Non-AP MLD may represent a station supporting the multi-link communication function. Referring to FIG. 2, the AP MLD may operate in three communication links, such as an AP1, an AP2, and an AP3 shown in FIG. 2. The APs may operate in a (communication) link 1, link 2, and link 3, respectively. The Non-AP MLD, such as an STA1, an STA2, and an STA3, shown in FIG. 2, may also operate in three links. The STA1 operates in link 1, the STA2 operates in link 2, and the STA3 operates in link 3. In the example of FIG. 2, it is configured that the AP1 communicates with the STA1 through the corresponding first link 1; similarly, the AP2 communicates with the STA2 through the corresponding second link 2, and the AP3 communicates with the STA3 through the third link 3. In addition, the links 1-3 may be multiple links at different frequencies, for example, links at 2.4 GHz, 5 GHZ, 6 GHZ, or several links with the same or different bandwidths at 2.4 GHz. Further, there may be multiple channels in each link. It may be understood that the communication scenario shown in FIG. 2 is merely exemplary, and the concept of the present disclosure is not limited thereto. For example, the AP MLD may be connected to multiple Non-AP MLDs, or the AP may communicate with multiple other types of stations in each link.

In a wireless communication process, before the Non-AP MLD transmits data, the Non-AP MLD checks whether each of the communication links (hereinafter referred to as links) is in an idle state. If a link is in a busy state, the Non-AP MLD delays access and uses an exponential backoff algorithm to avoid the occurrence of conflicts, and waits for the link to be idle again, thereby resulting in an access delay. This process is a random backoff process.

The operating mode information includes the STR or the NSTR, and there may be one or more second communication links in the idle state. The first communication link and the second communication link(s) may form an STR link pair, or may form an NSTR link pair. The device supporting the STR may simultaneously perform uplink communication and downlink communication in multiple communication links; however, the device supporting the NSTR, when performing the uplink communication in one link, cannot simultaneously perform the downlink communication in another link. The random backoff is independent in each communication link, and when the device senses that the channel is idle in the second communication link and senses that the channel is busy (that is, the channel is in an occupied state) in the first communication link, the corresponding random backoff is to be performed. Optionally, the first communication link and the second communication link are mutually an NSTR link pair.

It may be understood that when an operating mode of the second communication link with respect to the first communication link may form STR, the first communication link and the second communication link independently send data according to the operating mode for the STR.

At step 102, a target processing operation is performed on a contention window corresponding to the random backoff operation, and data is sent in the second communication link, where the operating mode information indicates that an operating mode of the second communication link with respect to the first communication link includes non-simultaneous transmit and receive (NSTR) communication links. Multiple link pairs formed by the first communication link and the second communication link may include the NSTR link pairs, or may include the NSTR link pairs and the STR link pairs.

In a process of performing the random backoff in a communication link, after previous frame data is transmitted completely, the Non-AP MLD attempts to transmit previously congested frame data after a time period of distributed inter-frame spacing (DIFS). A time period following the DIFS is a contention window (or a backoff window). The contention window may be further divided into slots, a number is randomly selected in a contention window to start counting-down, and then a channel is monitored once in each slot. When there is another device transmitting data, the current counting-down is frozen, and the counting-down continues when the channel is idle. Until the counting-down reaches 0, the node is allowed to perform data transmission. Through the backoff mechanism, some nodes with data to be transmitted may have their actual transmission times staggered on a timeline to reduce the probability of the occurrence of conflicts.

In the case where the random backoff is performed in the first communication link, and there is at least one second communication link that the at least one second communication link and the first communication link form an NSTR link pair, data is sent in the second communication link, and a target processing operation is performed on the contention window. The target processing operation includes, for example, releasing the contention window or maintaining the contention window.

Taking releasing the contention window as an example, in a case where the time length of a data packet sent in the second communication link is greater than or equal to the time length of the contention window, before completing data sending in the second communication link, the counting-down in the contention window has been completed, and it is no longer meaningful to maintain the contention window. Therefore, the contention window for performing the random backoff in the first communication link is released to avoid electrical energy consumption caused by the Non-AP MLD due to performing the random backoff. Therefore, in embodiments of the present disclosure, in this scenario, the contention window generated for performing the random backoff in the first communication link is released, such that the random backoff is disabled, and electrical energy of the device is saved. Optionally, releasing the contention window includes, for example, configuring a value of the counting-down in the contention window as 0.

Then, taking maintaining the contention window as an example, in a case where the time length of the data packet sent in the second communication link is less than the time length of the contention window, before completing the data sending in the second communication link, the counting-down in the contention window has not been completed, and at this time, the device still needs to sense a channel state and wait for an opportunity to send the data in the first communication link. Therefore, the contention window is maintained at this time.

In the embodiments of the present disclosure, in the case where the random backoff operation is performed in the first communication link, and there is a second communication link, in the idle state, supporting the NSTR, a target processing operation is performed on a contention window corresponding to the random backoff operation, and data continues to be sent in the second communication link. The embodiments of the present disclosure provide a manner of performing random backoff in a multi-link scenario.

In an optional embodiment, before determining the operating mode information of the second communication link with respect to the first communication link in the case where the random backoff operation is performed in the first communication link, the method includes:

determining that the random backoff operation is performed in the first communication link. Specifically, determining that the random backoff operation is performed in the first communication link includes:

- performing a channel clear assessment operation in communication links of the Non-AP MLD; and
- in a case where determining that the first communication link is in a busy state and the second communication link is in the idle state according to a result of the channel clear assessment operation, determining that the random backoff operation is performed in the first communication link, and generating the contention window.

Before the Non-AP MLD transmits data, the Non-AP MLD performs a channel clear assessment (CCA) operation for each of the communication links, and determines whether each of the communication links is in an idle state according to the result of the channel clear assessment operation. When the first communication link is in the busy state and the second communication link is in the idle state, to avoid a contention conflict, the Non-AP MLD allows to continue to transmit data in the second communication link. The Non-AP MLD performs random backoff for the first communication link, generates the contention window, randomly selects a number in the contention window to start to perform counting-down, then monitors the link once in each slot, freezes the current counting-down when another device transmits data, and continues to perform the counting-down when the link is idle.

In the case where the random backoff is performed in the first communication link, operating modes of other second communication links are obtained to determine a subsequent processing operation performed on the contention window.

In an optional embodiment, performing the target processing operation on the contention window corresponding to the random backoff operation includes:

- in a case where a time length of a data packet sent in the second communication link is greater than or equal to a time length of the contention window, releasing the contention window.

In a case where the time length of a data packet sent in the second communication link is greater than or equal to the time length of the contention window, before completing data sending in the second communication link, the counting-down in the contention window has been completed, and it is no longer meaningful to maintain the contention window. Therefore, at this time, the data should continue to be sent in the second communication link, and the contention window for performing the random backoff in the first communication link is released, to avoid electrical energy consumption caused by the Non-AP MLD due to performing the random backoff.

In an optional embodiment, performing the target processing operation on the contention window corresponding to the random backoff operation includes:

in a case where a time length of a data packet sent in the second communication link is less than a time length of the contention window, maintaining the contention window.

In the case where the time length of the data packet sent in the second communication link is less than the time length of the contention window, before completing the data sending in the second communication link, the counting-down in the contention window has not been completed, and at this time, the device still needs to sense a channel state and wait for an opportunity to send the data in the first communication link. Therefore, the contention window is maintained at this time.

Figure 3:
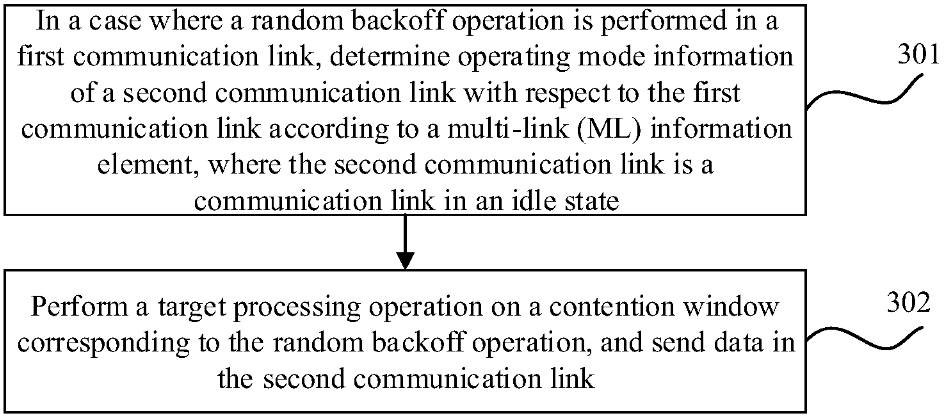
FIG. 3 is a second flowchart of a communication link control method provided by an embodiment of the present disclosure.

As shown in FIG. 3, an embodiment of the present disclosure provides a communication link control method. Optionally, the method may be applied to a station device supporting multi-link Non-AP MLD, and the method may include the following steps.

At step 301, in a case where a random backoff operation is performed in a first communication link, operating mode information of a second communication link with respect to the first communication link is determined according to a multi-link (ML) information element, where the second communication link is a communication link in an idle state.

In a process of performing the random backoff in a communication link, after previous frame data is transmitted completely, the Non-AP MLD attempts to transmit previously congested frame data after a time period of DIFS. A time period following the DIFS is a contention window (or a backoff window). The contention window may be further divided into slots, a number is randomly selected in a contention window to start counting-down, and then a channel is monitored once in each slot. When there is another device transmitting data, the current counting-down is frozen, and the counting-down continues when the channel is idle. Until the counting-down reaches 0, the node is allowed to perform data transmission. Through the backoff mechanism, some nodes with data to be transmitted may have their actual transmission times staggered on a timeline to reduce the probability of the occurrence of conflicts.

In the case where the random backoff is performed in the first communication link, operating mode information of the second communication link with respect to the first communication link is determined according to the multi-link (ML) information element. The multi-link (ML) information element includes multi-link control information, per-STA profile information, link information (link info), and common information (common info), etc.

The operating mode information includes the STR or the NSTR, that is, the first communication link and the second communication link form an STR link pair or an NSTR link pair. The device supporting the STR may simultaneously perform uplink communication and downlink communication in multiple communication links; however, the device supporting the NSTR, when performing the uplink communication in one link, cannot simultaneously perform the downlink communication in another link. The random backoff is independent in each communication link, and when the device senses that the channel is idle in the second communication link and senses that the channel is busy (that is, the channel is in an occupied state) in the first communication link, the corresponding random backoff is to be performed. Optionally, the first communication link and the second communication link are mutually an NSTR link pair.

It may be understood that when the operating mode information of the second communication link with respect to the first communication link is the STR, the first communication link and the second communication link respectively independently send data.

At step 302, a target processing operation is performed on a contention window corresponding to the random backoff operation, and data is sent in the second communication link, where the operating mode information indicates that an operating mode of the second communication link with respect to the first communication link includes non-simultaneous transmit and receive (NSTR) communication links.

The target processing operation includes, for example, releasing the contention window or maintaining the contention window.

In an optional embodiment, determining the operating mode information of the second communication link with respect to the first communication link according to the multi-link (ML) information element includes:

obtaining information of a maximum number of simultaneous links and information of a frequency separation for simultaneous transmit and receive (STR) of the ML information element; and determining the operating mode information of the second communication link with respect to the first communication link according to the information of the maximum number of simultaneous links and the information of the frequency separation for STR, where the operating mode information indicates that the operating modes of the second communication link with respect to the first communication link include the NSTR communication links and simultaneous transmit and receive (STR) communication links.

Optionally, the Non-AP MLD may carry information of frequency separations for STR between each of links in an initial association process (a multi-link establishment process), for example, a minimum unit of an separation is 20 MHz, and a maximum number of simultaneous links (the number of the separations) is 6; and when the Non-AP MLD determines, based on an operating frequency of each of the first communication link and the second communication link, that the information of the frequency separations for STR and the maximum number of simultaneous links cannot be met, the Non-AP MLD may determine that the operating modes of the first communication link and the second communication link are NSTR communication links, and the second communication link and the first communication link form an NSTR link pair.

In an optional embodiment, the information of the maximum number of simultaneous links and the information of the frequency separation for STR are carried in a common information (common Info) field of the ML information element.

As a second example, a format of the ML information element is shown in the following Table 1.

TABLE 1

| content | maximum number of simultaneous links | SRS support | TID-to-link mapping negotiation supported | frequency separation for STR | reserved |
|---|---|---|---|---|---|
| Bits | 4 | 1 | 2 | 5 | 4 |
| order of bits | B0 to B3 | B4 | B5 to B6 | B7 to B11 | B12 to B15 |

In Table 1, the information of the maximum number of simultaneous links and the information of the frequency separation for STR are carried in the common Info field.

In an optional embodiment, the ML information element is carried in a target radio frame.

The target radio frame includes at least one of: a multi-link (ML) probe request frame, an association request frame, or a reassociation request frame. It can be understood that in addition to this, the target radio frame may also include other forms, which is not specifically limited here in embodiments of the present disclosure.

In the embodiments of the present disclosure, in the case where the random backoff operation is performed in the first communication link, and there is the second communication link, in the idle state, supporting the NSTR, a target processing operation is performed on a contention window corresponding to the random backoff operation, and data continues to be sent in the second communication link. The embodiments of the present disclosure provide a manner of performing random backoff in a multi-link scenario.

Based on a principle same as the principle of the method provided in the embodiments of the present disclosure, an embodiment of the present disclosure further provides a station device. The station device may refer to a device providing voice and/or data connectivity to a user, a hand-held device having a wireless link function, or another processing device connected to a wireless modem, etc.

Figure 4:
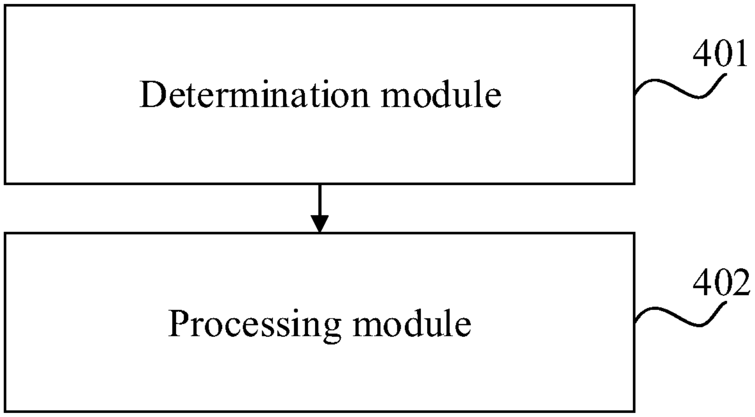
FIG. 4 is a schematic structural diagram of a communication link control apparatus provided by an embodiment of the present disclosure.

As shown in FIG. 4, an embodiment of the present disclosure provides a station device. The station device is a station device supporting multi-link Non-AP MLD, and includes a determination module 401 and a processing module 402.

The determination module 401 is configured for, in a case where a random backoff operation is performed in a first communication link, determining operating mode information of a second communication link with respect to the first communication link, where the second communication link is a communication link in an idle state.

In the embodiments of the present disclosure, the AP and the STA may be devices supporting multi-link, for example, the AP and the STA may be respectively represented as an AP MLD and a Non-AP MLD. For ease of description, an example in which one AP communicates with one STA in the multi-link is mainly described below, however, exemplary embodiments of the present disclosure are not limited thereto.

As a first example, referring to FIG. 2, the AP MLD may represent an access point supporting a multi-link communication function, and the Non-AP MLD may represent a station supporting the multi-link communication function. Referring to FIG. 2, the AP MLD may operate in three communication links, such as an AP1, an AP2, and an AP3 shown in FIG. 2. The APs may operate in a (communication) link 1, link 2, and link 3, respectively. The Non-AP MLD, such as an STA1, an STA2, and an STA3, shown in FIG. 2, may also operate in three links. The STA1 operates in link 1, the STA2 operates in link 2, and the STA3 operates in link 3. In the example of FIG. 2, it is configured that the AP1 communicates with the STA1 through the corresponding first link 1; similarly, the AP2 communicates with the STA2 through the corresponding second link 2, and the AP3 communicates with the STA3 through the third link 3. In addition, the links 1-3 may be multiple links at different frequencies, for example, links at 2.4 GHz, 5 GHz, 6 GHZ, or several links with the same or different bandwidths at 2.4 GHz. Further, there may be multiple channels in each link. It may be understood that the communication scenario shown in FIG. 2 is merely exemplary, and the concept of the present disclosure is not limited thereto. For example, the AP MLD may be connected to multiple Non-AP MLDs, or the AP may communicate with multiple other types of stations in each link.

In a wireless communication process, before the Non-AP MLD transmits data, the Non-AP MLD checks whether each of the communication links (hereinafter referred to as links) is in an idle state. If a link is in a busy state, the Non-AP MLD delays access and uses an exponential backoff algorithm to avoid the occurrence of conflicts, and waits for the link to be idle again, thereby resulting in an access delay. This process is a random backoff process.

The operating mode information includes the STR or the NSTR. The device supporting the STR may simultaneously perform the uplink communication and the downlink communication in multiple communication links; however, the device supporting the NSTR, when performing the uplink communication in one link, cannot simultaneously perform the downlink communication in another link. The random backoff is independent in each communication link, and when the device senses that the channel is idle in the second communication link and senses that the channel is busy (that is, the channel is in an occupied state) in the first communication link, the corresponding random backoff is to be performed. Optionally, the first communication link and the second communication link are mutually an NSTR link pair.

It may be understood that when the operating mode information of the second communication link with respect to the first communication link is the STR, the first communication link and the second communication link respectively independently send data.

The processing module 402 is configured for performing a target processing operation on a contention window corresponding to the random backoff operation, and sending data in the second communication link, where the operating mode information indicates that an operating mode of the second communication link with respect to the first communication link includes non-simultaneous transmit and receive (NSTR) communication links.

In a process of performing the random backoff in a communication link, after previous frame data is transmitted completely, the Non-AP MLD attempts to transmit previously congested frame data after a time period of distributed inter-frame spacing (DIFS). A time period following the DIFS is a contention window (or a backoff window). The contention window may be further divided into slots, a number is randomly selected in a contention window to start counting-down, and then a channel is monitored once in each slot. When there is another device transmitting data, the current counting-down is frozen, and the counting-down continues when the channel is idle. Until the counting-down reaches 0, the node is allowed to perform data transmission. Through the backoff mechanism, some nodes with data to be transmitted may have their actual transmission times staggered on a timeline to reduce the probability of the occurrence of conflicts.

In the case where the random backoff is performed in the first communication link, and the second communication link supports the NSTR, data is sent in the second communication link, and a target processing operation is performed on the contention window. The target processing operation includes, for example, releasing the contention window or maintaining the contention window.

Taking releasing the contention window as an example, in a case where a time length of a data packet sent in the second communication link is greater than or equal to a time length of the contention window, before completing data sending in the second communication link, the counting-down in the contention window has been completed, and it is no longer meaningful to maintain the contention window. Therefore, the contention window for performing the random backoff in the first communication link is released to avoid electrical energy consumption caused by the Non-AP MLD due to performing the random backoff. Therefore, in embodiments of the present disclosure, in this scenario, the contention window generated for performing the random backoff in the first communication link is released, such that the random backoff is disabled, and electrical energy of the device is saved. Optionally, releasing the contention window includes, for example, configuring a value of the counting-down in the contention window as 0.

Then, taking maintaining the contention window as an example, in a case where the time length of the data packet sent in the second communication link is less than the time length of the contention window, before completing the data sending in the second communication link, the counting-down in the contention window has not been completed, and at this time, the device still needs to sense a channel state and wait for an opportunity to send the data in the first communication link. Therefore, the contention window is maintained at this time.

Optionally, in the embodiments of the present disclosure, the station device includes: an operation determination module, configured for determining that the random backoff operation is performed in the first communication link.

Optionally, in the embodiments of the present disclosure, the operation determination module includes:

a sensing sub-module, configured for performing a channel clear assessment operation in communication links of the Non-AP MLD; and a first determination sub-module, configured for, in a case where determining that the first communication link is in a busy state and the second communication link is in the idle state according to a result of the channel clear assessment operation, determining that the random backoff operation is performed in the first communication link, and generating the contention window.

Optionally, in the embodiments of the present disclosure, the processing module 402 includes:

a releasing sub-module, configured for, in a case where the time length of a data packet sent in the second communication link is greater than or equal to the time length of the contention window, releasing the contention window.

Optionally, in the embodiments of the present disclosure, the processing module 402 includes:

a maintaining sub-module, configured for, in a case where the time length of a data packet sent in the second communication link is less than the time length of the contention window, maintaining the contention window.

Optionally, in the embodiments of the present disclosure, the determination module includes:

a second determination sub-module, configured for determining the operating mode information of the second communication link with respect to the first communication link according to a multi-link (ML) information element.

Optionally, in the embodiments of the present disclosure, the second determination sub-module includes:

an obtaining unit, configured for obtaining information of a maximum number of simultaneous links and information of a frequency separation for simultaneous transmit and receive (STR) of the ML information element; and a determination unit, configured for determining the operating mode information of the second communication link with respect to the first communication link according to the information of the maximum number of simultaneous links and the information of the frequency separation for STR, where the operating mode information indicates that the operating modes of the second communication link with respect to the first communication link include the NSTR communication links and simultaneous transmit and receive (STR) communication links.

Optionally, in the embodiments of the present disclosure, the information of the maximum number of simultaneous links and the information of the frequency separation for STR are carried in a common information (common Info) field of the ML information element.

Optionally, in the embodiments of the present disclosure, the ML information element is carried in a target radio frame; and where the target radio frame includes at least one of: a multi-link (ML) probe request frame, an association request frame, or a reassociation request frame.

In the embodiments of the present disclosure, in the case where the determination module 401 determines that the random backoff operation is performed in the first communication link and there is the second communication link, in the idle state, supporting the NSTR, the processing module 402 performs a target processing operation on a contention window corresponding to the random backoff operation, and continues to send data in the second communication link. The embodiments of the present disclosure provide a manner of performing random backoff in a multi-link scenario.

An embodiment of the present disclosure further provides a communication link control apparatus applied to a station device supporting multi-link Non-AP MLD. The apparatus includes:

an information determination module, configured for, in a case where a random backoff operation is performed in a first communication link, determining operating mode information of a second communication link with respect to the first communication link, where the second communication link is a communication link in an idle state; and a link processing module, configured for performing a target processing operation on a contention window corresponding to the random backoff operation, and sending data in the second communication link, where the operating mode information indicates that an operating mode of the second communication link with respect to the first communication link includes non-simultaneous transmit and receive (NSTR) communication links.

The apparatus further includes other modules of the station device in the above embodiments, which will not be repeated here.

Figure 5:
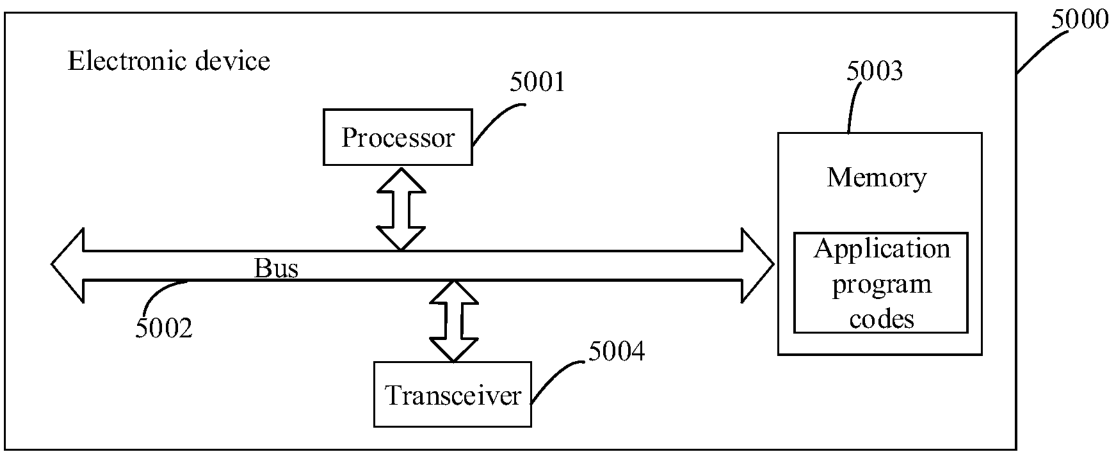
FIG. 5 is a schematic structural diagram of an electronic device provided by an embodiment of the present disclosure.

In an optional embodiment, an embodiment of the present disclosure further provides an electronic device. As shown in FIG. 5, the electronic device 5000 shown in FIG. 5 may be a server, including: a processor 5001 and a memory 5003. The processor 5001 is connected to the memory 5003, for example, by using a bus 5002. Optionally, the electronic device 5000 may further include a transceiver 5004. It is to be noted that it is not limited to one transceiver 5004 in practical applications, and the structure of the electronic device 5000 does not constitute a limitation on the embodiment of the present disclosure.

The processor 5001 may be a CPU (central processing unit), a general-purpose processor, a DSP (digital signal processor), an ASIC (application-specific integrated circuit), an FPGA (field programmable gate array), or other programmable logic devices, transistor logic devices, hardware components, or any combination thereof. The processor 5001 may implement or execute various exemplary logical blocks, modules, and circuits described in combination with the disclosure content of the present disclosure. The processor 5001 may also be a combination of implementing computing functions, and include, for example, a combination of one or more microprocessors, a combination of a DSP and a microprocessor, etc.

The bus 5002 may include a path to transfer information between the above components. The bus 5002 may be a PCI (peripheral component interconnect) bus or an EISA (extended industry standard architecture) bus, etc. The bus 5002 may include an address bus, a data bus, a control bus, etc. For ease of representation, only one thick line is shown in FIG. 5, which does not mean that there is only one bus or one type of bus.

The memory 5003 may be an ROM (read only memory) or other types of static storage devices that may store static information and instructions, an RAM (random access memory) or other types of dynamic storage devices that may store information and instructions, or may also be an EEPROM (electrically erasable programmable read only memory), a CD-ROM (compact disc read only memory) or other optical disc storages, optical disk storages (including a compressed disk, a laser disk, an optical disk, a digital common disk, a Blu-ray disk, etc.), a magnetic disk storage medium or other magnetic storage device, or any other medium that can be configured for carrying or storing desired program codes in the form of an instruction or data structure and can be accessed by a computer, but is not limited thereto.

The memory 5003 is configured for storing application program codes for executing the solutions of the present disclosure, and the processor 5001 controls the executing. The processor 5001 is configured for executing the application program codes stored in the memory 5003, to implement the content shown in the above method embodiments.

The electronic device includes, but is not limited to, a mobile terminal such as a mobile phone, a notebook computer, a digital broadcast receiver, a PDA (personal digital assistant), a PAD (tablet computer), a PMP (portable multimedia player), an in-vehicle terminal (for example, an in-vehicle navigation terminal), and a fixed terminal such as a digital TV or a desktop computer. The electronic device shown in FIG. 8 is merely an example, and should not bring any limitation to the function and use scope of the embodiments of the present disclosure.

The server provided by the present disclosure may be an independent physical server, or may also be a server cluster or a distributed system formed by multiple physical servers, or may also be a cloud server that provides basic cloud computing services such as a cloud service, a cloud database, cloud computing, a cloud function, cloud storage, a network service, cloud communication, a middleware service, a field name service, a security service, a CDN, and a big data and artificial intelligence platform. The terminal may be a smartphone, a tablet computer, a notebook computer, a desktop computer, a smart speaker, a smart watch, etc., but is not limited thereto. The terminal may be directly or indirectly connected to the server through a wired or wireless communication manner, which is not limited to the present disclosure.

An embodiment of the present disclosure provides a computer-readable storage medium. The computer-readable storage medium stores a computer program. The computer program, when executed by a computer, enables the computer to execute corresponding content in the above method embodiments.

It should be understood that although various steps in the flowcharts of the accompanying drawings are sequentially shown as indicated by arrows, these steps are not necessarily sequentially performed in the order indicated by the arrows. Unless explicitly stated herein, the performance of these steps is not strictly limited in order and may be performed in other orders. In addition, at least a part of the steps in the flowcharts of the accompanying drawings may include multiple sub-steps or multiple stages, and these sub-steps or stages are not necessarily performed completely at the same moment, but may be performed at different moments, and the performing order thereof is not necessarily performed sequentially, but may be performed in turns or alternately with at least a part of other steps or of sub-steps or stages of other steps.

It is to be noted that the computer-readable medium described above in the present disclosure may be a computer-readable signal medium, a computer-readable storage medium, or any combination of the above two. The computer-readable storage medium may be, for example, but is not limited to, an electrical, magnetic, optical, electromagnetic, infrared, or semiconductor system, apparatus, or device, or any combination of the above. More specific examples of the computer readable storage medium may include, but are not limited to, an electrically connected portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any suitable combination of the above that has one or more wires. In the present disclosure, the computer-readable storage medium may be any tangible medium containing or storing a program. The program may be used by or in combination with an instruction execution system, apparatus, or device. However, in the present disclosure, the computer-readable signal medium may include a data signal propagated in a baseband or as a part of a carrier wave, in which the computer-readable program codes are carried. This propagated data signal may take many forms, including but not limited to an electromagnetic signal, an optical signal, or any suitable combination of the above. The computer-readable signal medium may also be any computer-readable medium other than the computer-readable storage medium. The computer-readable medium may send, propagate, or transmit a program used by or in combination with the instruction execution system, apparatus, or device. The program codes contained in the computer-readable medium may be transmitted by any suitable medium, including but not limited to an electrical wire, an optical cable, an RF (radio frequency), etc., or any suitable combination of the above.

The computer-readable medium may be included in the above electronic device, or may also exist alone without being assembled into the electronic device.

The above computer-readable medium carries one or more programs, and the above one or more programs, when executed by the electronic device, enable the electronic device to perform the method shown in the above embodiments.

According to an aspect of the present disclosure, a computer program product or a computer program is provided. The computer program product or the computer program includes computer instructions stored in a computer-readable storage medium. A processor of the computer device reads the computer instructions from the computer-readable storage medium, and the processor executes the computer instructions, to enable the computer device to perform the communication link control method provided in the above various optional implementations.

Computer program codes configured for performing operations of the present disclosure may be written in one or more programming languages or combinations thereof. The above programming languages include object-oriented programming languages such as Java, Smalltalk, and C++, and they also include conventional procedural programming languages such as C or similar programming languages. The program codes may be executed completely by the computer of the user, partially by the computer of the user, as a separate software package, partially by the computer of the user and partially by a remote computer, or completely by the remote computer or the server. In the case of a remote computer, the remote computer may be connected to the computer of the user through any kind of network, including a local area network (LAN) or a wide area network (WAN), or may be connected to an external computer (for example, through the Internet by an Internet service provider).

The flowcharts and block diagrams in the accompanying drawings illustrate architectures, functions, and operations possibly implemented by the system, method, and computer program product according to various embodiments of the present disclosure. In this regard, each block in the flowcharts or block diagrams may represent a module, a program segment, or a part of code that contains one or more executable instructions configured for implementing a specified logical function. It should also be noted that in some alternative implementations, functions marked in the blocks may also occur in an order different from the order marked in the accompanying drawings. For example, two blocks represented successively may actually be performed basically in parallel, and they may also sometimes be performed in an opposite order, depending on the function involved. It is also to be noted that each block in the block diagrams and/or flowcharts and a combination of blocks in the block diagrams and/or flowcharts may be implemented by a dedicated hardware-based system performing specified functions or operations, or by a combination of dedicated hardware and computer instructions.

Involved modules described in the embodiments of the present disclosure may be implemented in a manner of software or may also be implemented in a manner of hardware. Titles of the modules do not constitute a limitation on the modules themselves in some cases. For example, a module A may also be described as "a module A for performing an operation B."

The above description is only a better embodiment of the present disclosure and an illustration of applied technical principles. Those skilled in the art should understand that the disclosure scope involved in the present disclosure is not limited to technical solutions formed by specific combinations of the above technical features, and should also include other technical solutions formed by any combination of the above technical features or their equivalent features without departing from the above concept of the present disclosure, for example, technical solutions formed by interchanging the above features with (but not limited to) technical features with similar functions disclosed in the present disclosure.

In another aspect, an embodiment of the present disclosure further provides a station device. The station device is a station device supporting multi-link Non-AP MLD, and includes:

a determination module, configured for, in a case where a random backoff operation is performed in a first communication link, determining operating mode information of a second communication link with respect to the first communication link, where the second communication link is a communication link in an idle state; and a processing module, configured for performing a target processing operation on a contention window corresponding to the random backoff operation, and sending data in the second communication link, where the operating mode information indicates that an operating mode of the second communication link with respect to the first communication link includes non-simultaneous transmit and receive (NSTR) communication links.

In another aspect, an embodiment of the present disclosure further provides a communication link control apparatus, applied to a station device supporting multi-link Non-AP MLD. The apparatus includes:

an information determination module, configured for, in a case where a random backoff operation is performed in a first communication link, determining operating mode information of a second communication link with respect to the first communication link, where the second communication link is a communication link in an idle state; and a link processing module, configured for performing a target processing operation on a contention window corresponding to the random backoff operation, and sending data in the second communication link, where the operating mode information indicates that an operating mode of the second communication link with respect to the first communication link includes non-simultaneous transmit and receive (NSTR) communication links.

The invention claimed is:

1. A communication link control method, applied to a station device supporting multi-link (Non-AP MLD), and comprising:

in a case where a random backoff operation is performed in a first communication link, determining operating mode information of a second communication link with respect to the first communication link, wherein the second communication link is a communication link in an idle state; and performing a target processing operation on a contention window corresponding to the random backoff operation, and sending data in the second communication link;

wherein before determining the operating mode information of the second communication link with respect to the first communication link in the case where the random backoff operation is performed in the first communication link, the method comprises:

determining that the random backoff operation is performed in the first communication link;

wherein determining the operating mode information of the second communication link with respect to the first communication link comprises:

determining the operating mode information of the second communication link with respect to the first communication link according to a multi-link (ML) information element.

2. The communication link control method of claim 1, wherein determining that the random backoff operation is performed in the first communication link comprises:

performing a channel clear assessment operation in communication links of the Non-AP MLD; and in a case where determining that the first communication link is in a busy state and the second communication link is in the idle state according to a result of the channel clear assessment operation, determining that the random backoff operation is performed in the first communication link, and generating the contention window.

3. The communication link control method of claim 1, wherein performing the target processing operation on the contention window corresponding to the random backoff operation comprises:

in a case where a time length of a data packet sent in the second communication link is greater than or equal to a time length of the contention window, releasing the contention window.

4. The communication link control method of claim 3, wherein releasing the contention window comprises:

configuring a value of counting-down in the contention window as 0.

5. The communication link control method of claim 1, wherein performing the target processing operation on the contention window corresponding to the random backoff operation comprises:

in a case where a time length of a data packet sent in the second communication link is less than a time length of the contention window, maintaining the contention window.

6. The communication link control method of claim 1, wherein determining the operating mode information of the second communication link with respect to the first communication link according to the multi-link (ML) information element comprises:

obtaining information of a maximum number of simultaneous links and information of a frequency separation for simultaneous transmit and receive (STR) of the ML information element; and determining the operating mode information of the second communication link with respect to the first communication link according to the information of the maximum number of simultaneous links and the information of the frequency separation for STR, wherein the operating mode information indicates that the operating modes of the second communication link with respect to the first communication link comprise non-simultaneous transmit and receive (NSTR) communication links and simultaneous transmit and receive (STR) communication links.

7. The communication link control method of claim 6, wherein the information of the maximum number of simultaneous links and the information of the frequency separation for STR are carried in a common information (common Info) field of the ML information element.

8. The communication link control method of claim 1, wherein the ML information element is carried in a target radio frame; and wherein the target radio frame comprises at least one of: a multi-link (ML) probe request frame, an association request frame, or a reassociation request frame.

9. The communication link control method of claim 1, wherein the Non-AP MLD comprises a first station (STA1), a second station (STA2), and a third station (STA3); the STA1 operates in the first communication link, the STA2 operates in the second communication link, and the STA3 operates in a third communication link; the STA1 communicates with a first access point (AP1) through the first communication link, the STA2 communicates with a second access point (AP2) through the second communication link, and the STA3 communicates with a third access point (AP3) through the third communication link; the first communication link, the second communication link, and the third communication link are links at different frequencies.

10. An electronic device that supports multi-link (Non-AP MLD), the electronic device comprising:

a memory, one or more processors that are communicatively coupled to the memory, wherein the one or more processors are collectively configured to:

in a case where a random backoff operation is performed in a first communication link, determine operating mode information of a second communication link with respect to the first communication link, wherein the second communication link is a communication link in an idle state; and perform a target processing operation on a contention window corresponding to the random backoff operation, and sending data in the second communication link;

wherein before determining the operating mode information of the second communication link with respect to the first communication link in the case where the random backoff operation is performed in the first communication link, the one or more processors are further collectively configured to:

determine that the random backoff operation is performed in the first communication link;

wherein when determining the operating mode information of the second communication link with respect to the first communication link, the one or more processors are collectively configured to:

determine the operating mode information of the second communication link with respect to the first communication link according to a multi-link (ML) information element.

11. The electronic device of claim 10, wherein the one or more processors are collectively configured to:

perform a channel clear assessment operation in communication links of the Non-AP MLD; and in a case where determining that the first communication link is in a busy state and the second communication link is in the idle state according to a result of the channel clear assessment operation, determine that the random backoff operation is performed in the first communication link, and generate the contention window.

12. The electronic device of claim 10, wherein the one or more processors are collectively configured to:

in a case where a time length of a data packet sent in the second communication link is greater than or equal to a time length of the contention window, release the contention window.

13. The electronic device of claim 10, wherein the one or more processors are collectively configured to:

in a case where a time length of a data packet sent in the second communication link is less than a time length of the contention window, maintain the contention window.

14. The electronic device of claim 10, wherein the one or more processors are collectively configured to:

obtain information of a maximum number of simultaneous links and information of a frequency separation for simultaneous transmit and receive (STR) of the ML information element; and determine the operating mode information of the second communication link with respect to the first communication link according to the information of the maximum number of simultaneous links and the information of the frequency separation for STR, wherein the operating mode information indicates that the operating modes of the second communication link with respect to the first communication link comprise non-simultaneous transmit and receive (NSTR) communication links and simultaneous transmit and receive (STR) communication links.

15. The electronic device of claim 14, wherein the information of the maximum number of simultaneous links and the information of the frequency separation for STR are carried in a common information (common Info) field of the ML information element.

16. The electronic device of claim 10, wherein the ML information element is carried in a target radio frame; and wherein the target radio frame comprises at least one of: a multi-link (ML) probe request frame, an association request frame, or a reassociation request frame.

17. A non-transitory computer readable storage medium, storing a computer program for supporting multi-link (Non-AP MLD), wherein a processor executes the computer program to:

in a case where a random backoff operation is performed in a first communication link, determine operating mode information of a second communication link with respect to the first communication link, wherein the second communication link is a communication link in an idle state; and perform a target processing operation on a contention window corresponding to the random backoff operation, and sending data in the second communication link;

before determining the operating mode information of the second communication link with respect to the first communication link in the case where the random backoff operation is performed in the first communication link, the processor is further configured to:

determine that the random backoff operation is performed in the first communication link;

wherein when determining the operating mode information of the second communication link with respect to the first communication link, the processor is configured to:

determine the operating mode information of the second communication link with respect to the first communication link according to a multi-link (ML) information element.

* * * * *